Figure 1:
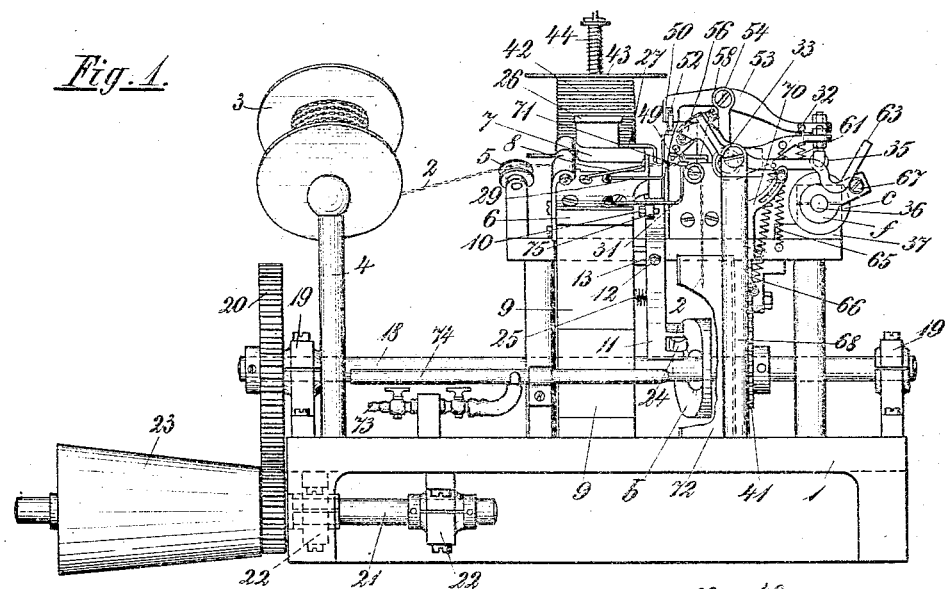

No. 870,414. PATENTED NOV. 5, 1907.
L. BRUCKMANN.
MACHINE FOR AUTOMATICALLY MAKING SOLDERED CABLE AND GLOBULAR OR PEA SHAPED CHAINS.
APPLICATION FILED MAR. 19, 1906.

4 SHEETS—SHEET 1.

Witnesses
Albert Poplein
Geo. E. Evans

Inventor
Ludwig Bruckmann
By Sturtevant & Freeley
Attys

No. 870,414. PATENTED NOV. 5, 1907.
L. BRUCKMANN.
MACHINE FOR AUTOMATICALLY MAKING SOLDERED CABLE AND GLOBULAR OR PEA SHAPED CHAINS.
APPLICATION FILED MAR. 19, 1906.
4 SHEETS—SHEET 2.
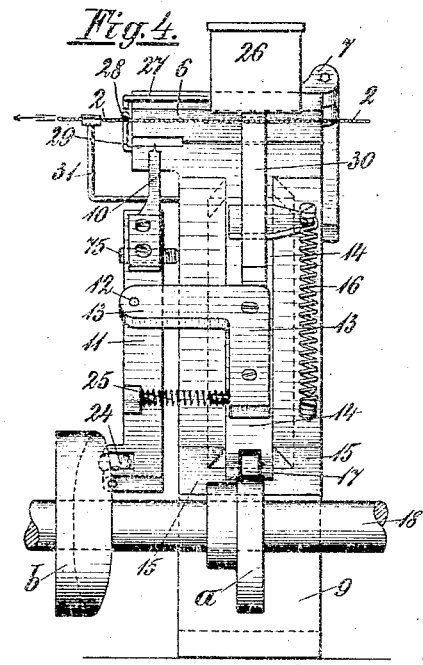
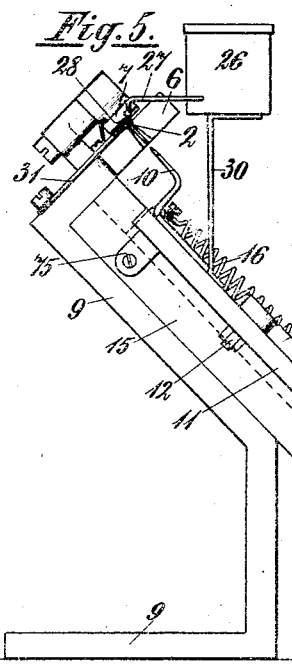
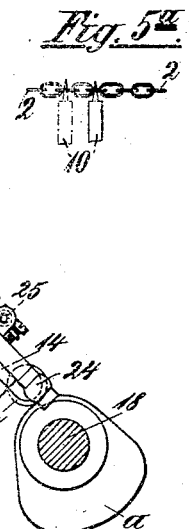
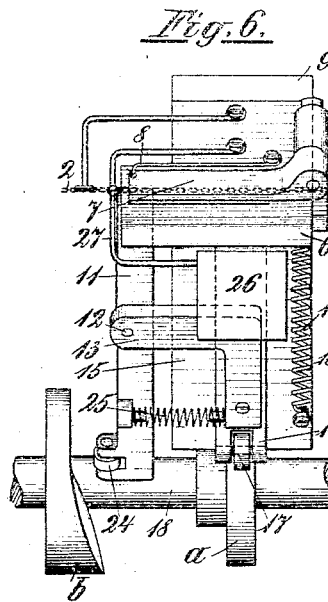
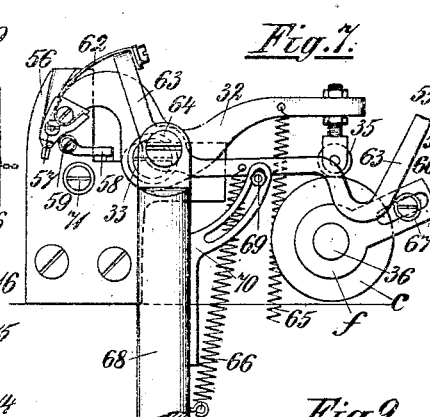
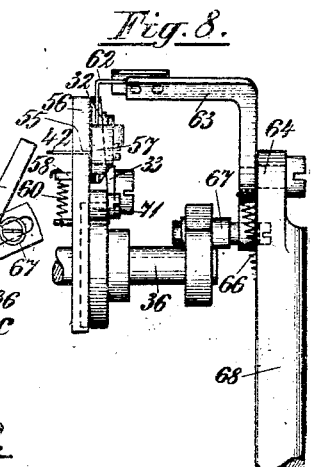
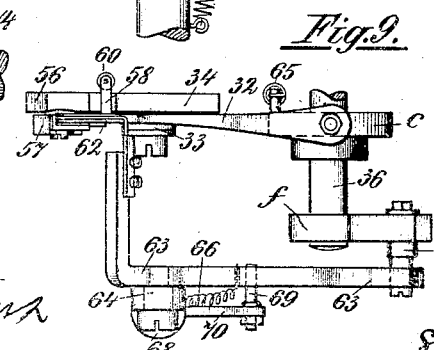
Witnesses
Albert Popkins
Geo. H. Evans
Inventor
L. Bruckmann
By Sturtevant & Freley
attys

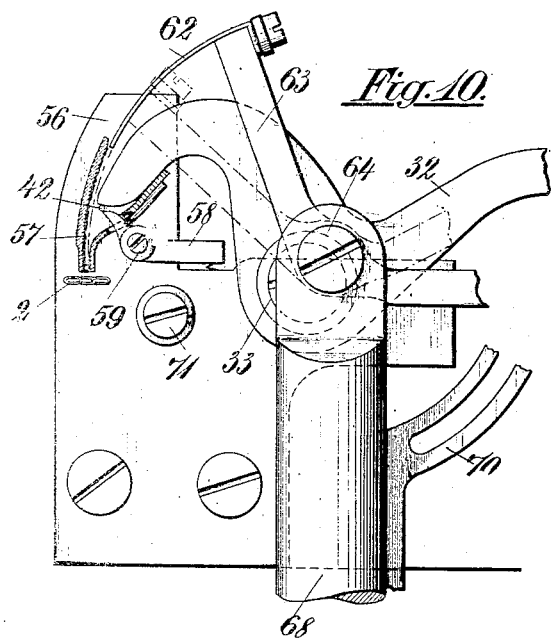
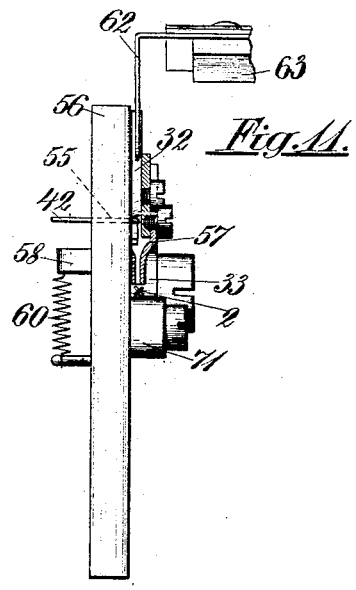
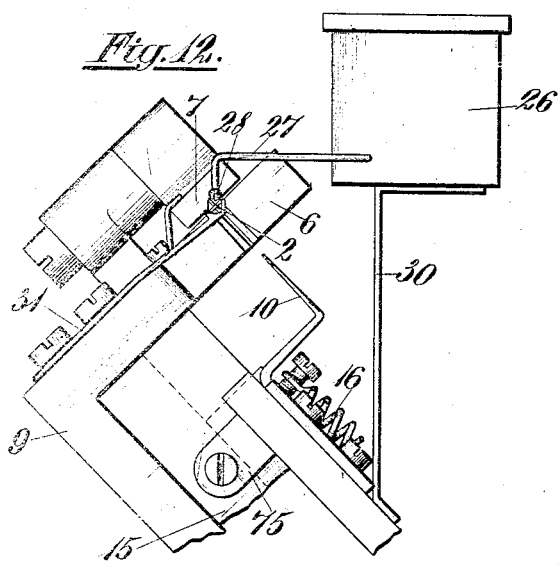
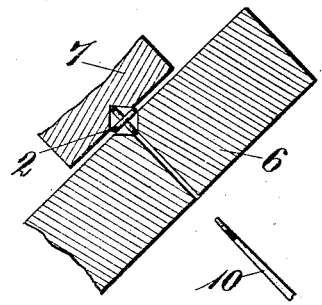

No. 870,414. PATENTED NOV. 5, 1907.
L. BRUCKMANN.
MACHINE FOR AUTOMATICALLY MAKING SOLDERED CABLE AND GLOBULAR
OR PEA SHAPED CHAINS.
APPLICATION FILED MAR. 19, 1906.
4 SHEETS—SHEET 4.
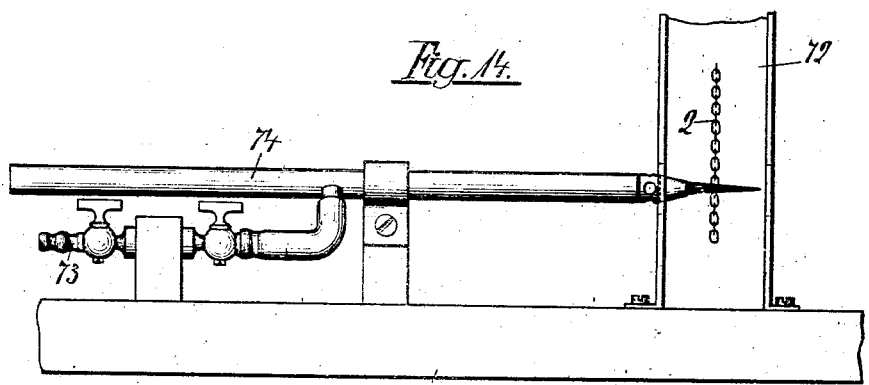
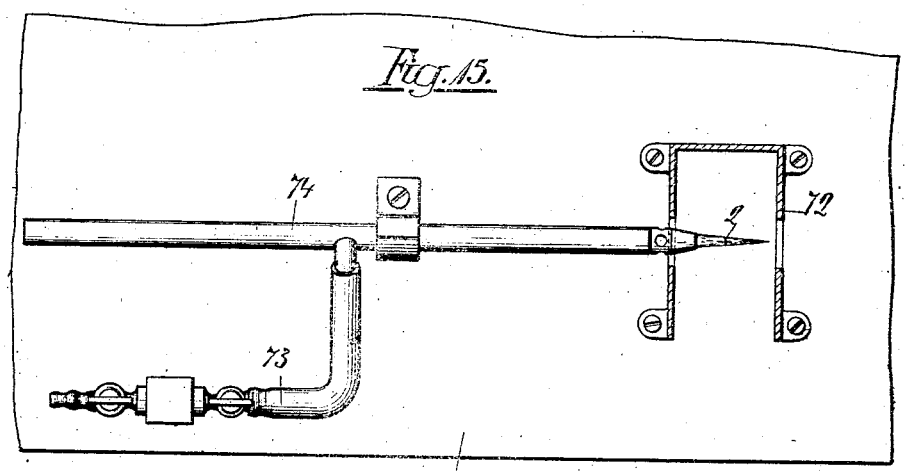

UNITED STATES PATENT OFFICE.

LUDWIG BRUCKMANN, OF PFORZHEIM, GERMANY.

MACHINE FOR AUTOMATICALLY MAKING SOLDERED CABLE AND GLOBULAR OR PEA-SHAPED CHAINS.

No. 870,414.      Specification of Letters Patent.      Patented Nov. 5, 1907.

Application filed March 19, 1906. Serial No. 306,879.

*To all whom it may concern:*

Be it known that I, LUDWIG BRUCKMANN, a citizen of the German Empire, residing at Pforzheim, in the Grand Duchy of Baden, Empire of Germany, have invented certain new and useful Improvements in Machines for Automatically Making Soldered Cable and Globular or Pea-Shaped Chains, of which the following is a description, reference being had to the accompanying drawing and to the letters and figures of reference marked thereon.

This invention relates to an improvement in the machines for automatically making soldered cable and globular or pea-shaped chains, and this improvement relates more particularly to an automatic arrangement for soldering such chains. By the present invention these operations, that is to say, the application of the soldering fluid or flux, the touching with solder and the heating of the chain, and more particularly its conveyance, are performed automatically. The links of the chain must be suspended connected, that is to say, the joints of each two links must be constantly in contact.

By the present invention the forward movement of the chain takes place by means of a spur or pin which for this object engages in the aperture of a link and draws the chain forward to the extent of two links, that is to say, to a soldering place. A vessel containing the soldering flux is arranged on the carriage of this spur, by means of which vessel the application of the solder takes place on the descent of the carriage. The feeding of the solder and the cutting off of a suitable piece, and also the feed of the same to the soldering place, are effected by an eccentric moved by a driving gear common to all. The cut off piece of solder passes into a channel from which it is ejected by an ejector and comes direct to the place in the chain links which is to be soldered. In consequence of the application of the soldering flux, the solder remains adherent on the chain and passes with it to the soldering flame which serves to fuse the solder, whereby the links are automatically closed.

Figure 2:
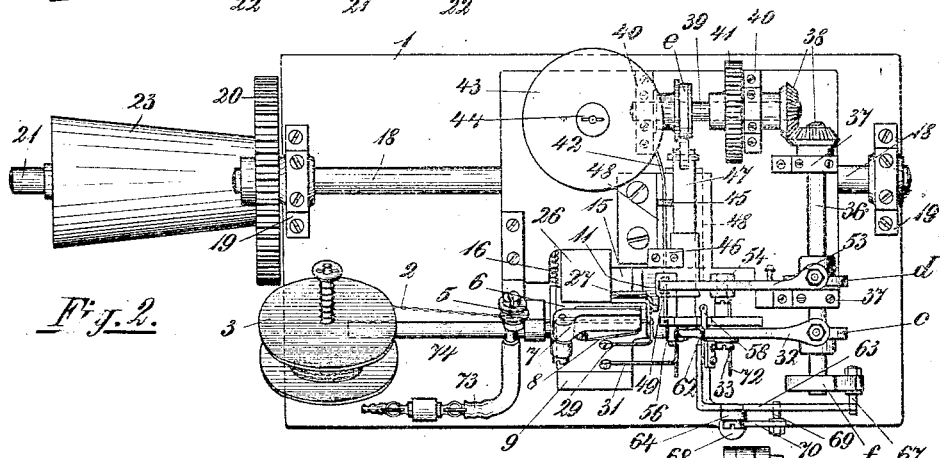
Figure 3:
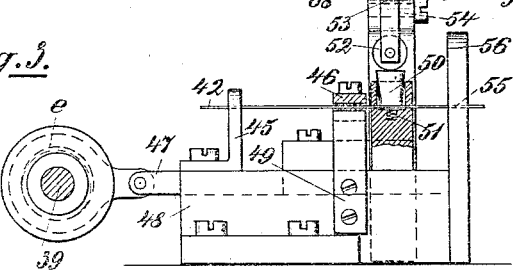

The invention is shown in the accompaying drawings, in which,

Figure 1 is a front view; and Fig. 2, a plan view of the machine as a whole; Fig. 3, a side view on an enlarged scale and partial section showing the projection of the solder; Figs. 4 and 5 are rear and side views respectively of the devices for moving the chain and applying the soldering flux; Fig. 5ᵃ is a detail view illustrating the progressive movement of the chain; Fig. 6, a plan view of Fig. 4; Figs. 7 and 8, front and side views respectively and a plan view of the cutting off of the solder. Fig. 9 is a plan view of the mechanism shown in Figs. 7 and 8; Fig. 10 is an elevation, partly in section, of the solder cutting mechanism; Fig. 11 is an end view of the same, partly in section; Fig. 12 is a detail view of the chain guides; Fig. 13 is a detail sectional view of the guiding members proper. Fig. 14 is an elevation of the soldering jet, the front plate of the casing being removed. Fig. 15, is a plan view of the same, the casing being shown in section.

A support 4 of a revoluble roller 3 is mounted on the machine frame 1, on which roller the chain 2 to be soldered is wound with engaged suspended links. This runs from here over a guide roller 5 to the chain shifting or conveying device.

A pin or spur 10, the point of which enters the aperture of a link of the chain, serves for moving the chain 2 forward and this spur moves the chain forward to the extent of two links, that is to say, to one soldering place. It thus executes a double movement, namely, an upward movement for engaging the respective link of the chain, and then a lateral movement.

For the purpose of the upward movement the spur 10 is mounted on a lever 11 standing under the action of a spring 25 and pivotally mounted on a pin 12 of an arm 13. The arm 13 is carried by a carriage 14 which travels in guides 15 on standards 9. The carriage 14 is under the action of a spring 16 and is moved by an eccentric *a* which is mounted on a spindle 18 which is revoluble in bearings 19. This eccentric is driven from a driving pulley 23 which is mounted on a spindle 21 revoluble in bearings 22, the transmission of the rotary motion taking place by means of gear wheels 20. A roller 17 is revolubly mounted on the carriage 14 for the purpose of diminishing friction, which roller travels on the eccentric *a*.

The lateral movement is imparted to the arm 10 by means of a cam disk *b* also mounted on the shaft 18, which cam disk moves the end of the two-armed lever 11, which end is provided with a roller 24, and may be regulated by means of an adjustable catch 75. Hereby the chain 2 is fed, traveling in guides. These guides consist of a pair of fixed check plates 6 and a hinged plate 7. The several plates are grooved to form V-shaped guiding channels for one series of chain links, while the other series is guided between the plates 6 on one side and the plate 7 on the other. The movable jaw 7 is held down in closed position by a spring 8.

By the sinking of the carriage 14, when accordingly the spur 10 does not engage in a chain link and thus the chain 2 is stationary, the soldering flux is applied. For this object the carriage 14 carries a soldering flux container 26 which is arranged on a support 30 and provided with a small pipe 27 in the aperture of which a sponge 28 or the like is inserted, with which the soldering flux is supplied. Now when the carriage 14 sinks, the sponge 28 which is always saturated with the soldering flux encounters the joint of two chain links, the chain 2 being supported by a support 29 and carried by another guide 31. The wetted soldering place now reaches the cutting device at which the solder 42 is cut off. This is preferably in the form of wire wound on a roller 43 revoluble on a shaft 44. From here the soldering wire 42 passes through a fixed guide 45 and through a friction brake 46 of leather or the like which is arranged on the fixed arm 49 and prevents any slipping back of the wire 42 (Fig. 3). From the brake 46 the wire 42 reaches the conveying apparatus. This consists of a pressure bolt 50 standing under the action of a spring 51, which bolt is mounted in a projection or shoulder of the carriage 47 sliding in the guides 49 on a block 48, which carriage is moved by a cam disk $e$ mounted on the shaft 39. In the forward movement of the carriage 47 the soldering wire is clamped by means of the pressure bolt 50 by an eccentric $d$ mounted on the shaft 36, which moves a lever 53 standing under the action of a spring 61 and pivotally mounted on a pin 54, which lever in turn by means of its pressure roller 52 depresses the bolt 50. The shaft 39 mounted in the bearings 40 is operated from the shaft 18 by means of gear wheels 41, the rotary motion being transmitted to the shaft 36 which is revoluble in bearings 37, by means of bevel wheels 38. The soldering wire 42 now passes from the conveying apparatus through an aperture 55 of a plate 56 forming the fixed jaw of the cutting appliance, and is projected each time so far as is necessary to supply a piece of solder of sufficient size for soldering the chain links. The projecting piece is now cut off by a knife 32 formed as a lever, which knife is mounted on a pin 33 pivotal on the fixed jaw 56 and which is operated by a spring 65. The movement of the knife 32 is produced by a cam disk $c$ mounted on the shaft 36, on which cam disk an adjustable roller 35 travels. The cut off piece of soldering wire passes into a channel which is provided in a suitably recessed plate 57 arranged under the knife 32 and which prevents the cut off piece of solder from springing out. A movable dog 58 extending up to the knife 32 is also provided, which dog is pivoted on the pin 59 and is under the action of a spring 60, by which arrangement the cut off particle of solder comes with certainty into the channel whereupon it is expelled from the channel by the ejector 62 and laid on the soldering place. It will be noted that the dog 58 is arranged immediately under the movable cutting knife so that as the piece of solder is severed from the strip it will be clamped and held between the cutter and dog. As the cutter continues its downward movement, it carries the dog down with it until as the cutter nears the limit of its downward movement, the piece of solder is moved past the end of the dog and drops into the ejecting channel. This ejector is mounted on a lever 63 pivoted on a pin 64 carried by a support 68, which lever is under the action of a spring 66 and is moved by a contact roller 67 carried by a crank arm $f$ on the shaft 36, a stop 69 adjustable or displaceable on a regulating arc 70 being provided for limiting the position of repose. After the chain 2 is provided with solder it passes, traveling over a roller 71, to the soldering flame within a protective casing 72. The flame is fed in the ordinary way for obtaining a great heat by a mixture of gas and air which is conveyed to it through pipes 73 and 74.

The method of working of the machine is as follows:—The spur first enters a chain link and pushes a fresh soldering place under the solder ejector. On the return of the spur 10, the next soldering place is also moistened with soldering flux by the sponge 28. In the meantime a piece of solder is cut off by the knife 32 and thrown by the ejector 62 on the soldering place where it adheres in consequence of the application of the soldering flux, after which the chain, which has reached the soldering flame, is there automatically soldered, the piece of solder being held in place by adhesion of the flux and being fused when subjected to the heat of the flame.

I claim:

1. In a chain soldering machine, means for guiding the chain, means for engaging and intermittently feeding said chain, a flux applying member carried by and movable with the chain feeder to apply flux after each feeding movement, a solder strip feeder, means for cutting particles of solder from the strip and intermittently feeding such particles to the chain, the solder being held in place by the flux, and means for fusing the solder.

2. In a machine of the class described, stationary jaws and a movable jaw all provided with chain guiding grooves, the walls of such grooves being arranged to engage and maintain the two series of links of which the chain is formed in proper relative positions, a chain feeding pin arranged to engage with alternate links, a slidable carriage, a pivotally mounted pin carrying lever mounted thereon, means for moving the carriage toward and from the chain, means for operating the lever to feed the chain, and an intermittently operable flux applying member supported by said carriage.

3. In a machine of the class described, a plurality of chain guiding jaws having grooves for the reception of the chain links, a reciprocatory carriage, means for actuating the same, a lever pivoted to said carriage, a chain engaging pin secured to the lever, means for rocking said lever and thereby effecting feeding of the chain, and a flux applying member supported by the carriage.

4. In a mechanism of the class described, the combination with chain guiding jaws, of a reciprocatory carriage, a lever pivoted on such carriage, a chain feeding pin secured to the lever, a shaft, and a pair of cams secured to the shaft, one of said cams engaging the carriage, and the other engaging the lever.

5. In a mechanism of the class described, the combination with the chain guiding jaws, of means for feeding the chain, a reciprocatory carriage, a spring supported conical roller carried thereby and arranged to engage and feed the solder strip, and means for depressing the roller and thus effecting its engagement with the strip during the movement of the carriage in one direction.

6. In a mechanism of the class described, the combination with the guiding and feeding means, of a reciprocatory carriage, a conical solder strip feeding roller, a spring tending to move the same to release the strip, a pivotally mounted lever, a roller carried thereby and arranged to engage the conical roller during the forward movement of the carriage and to release said roller during the rearward movement of the carriage thereby alternately clutching and unclutching the strip, and means for actuating said lever.

7. In a machine of the class described, the combination with a chain guiding and feeding means, of a solder strip feeding device, a pivotally mounted cutter, a discharge chute for receiving the severed piece of solder, and an ejector movable through the chute for forcing the severed piece of solder to the chain.

8. In a machine of the class described, a solder strip feeder, a strip cutting knife, a chute into which the pieces of solder fall after clipping, means for feeding the chain beneath the chute, and means for forcing the severed piece of solder through the chute to the chain.

9. In a machine of the class described, solder strip feeding means, a movable knife for severing pieces of solder from the strip, a pivotally mounted spring held pawl co-acting with the knife to hold and carry the severed pieces of solder, a chute into which the severed piece is delivered, and an ejector for forcing the piece of solder through such chute.

In testimony whereof I affix my signature, in presence of two witnesses.

LUDWIG BRUCKMANN.

Witnesses:
RUDOLF BRECHT,
WALTER SCHWAEBSCH.